(12) United States Patent
Duyvesteyn et al.

(10) Patent No.: US 7,909,989 B2
(45) Date of Patent: Mar. 22, 2011

(54) METHOD FOR OBTAINING BITUMEN FROM TAR SANDS

(75) Inventors: Willem P. C. Duyvesteyn, Reno, NV (US); Raymond L. Morley, Sparks, NV (US); James S. Hanson, Berkeley, CA (US)

(73) Assignee: Marathon Oil Canada Corporation, Calgary, Alberta (CA)

( * ) Notice: Subject to any disclaimer, the term of this patent is extended or adjusted under 35 U.S.C. 154(b) by 1529 days.

(21) Appl. No.: 11/249,234

(22) Filed: Oct. 12, 2005

(65) Prior Publication Data
US 2006/0076274 A1    Apr. 13, 2006

Related U.S. Application Data

(60) Provisional application No. 60/617,739, filed on Oct. 13, 2004.

(51) Int. Cl.
*C10G 1/04* (2006.01)
(52) U.S. Cl. .......................... 208/390; 208/45
(58) Field of Classification Search .................. 208/45, 208/390, 391
See application file for complete search history.

(56) References Cited

U.S. PATENT DOCUMENTS

| | | | |
|---|---|---|---|
| 2,871,180 A | 1/1959 | Lowman et al. | |
| 3,131,141 A * | 4/1964 | West | 208/390 |
| 3,527,692 A * | 9/1970 | Titus | 208/435 |
| 3,779,902 A | 12/1973 | Mitchell et al. | |
| 4,035,282 A | 7/1977 | Stuchberry et al. | |
| 4,046,668 A | 9/1977 | Farcasiu et al. | |
| 4,120,773 A | 10/1978 | Ridgway | |
| 4,120,777 A | 10/1978 | Globus | |
| 4,139,450 A * | 2/1979 | Hanson et al. | 208/390 |
| 4,308,133 A | 12/1981 | Meyer | |
| 4,347,118 A | 8/1982 | Funk et al. | |
| 4,490,259 A | 12/1984 | Coffing | |
| 4,589,980 A | 5/1986 | Keys | |
| 4,596,651 A * | 6/1986 | Wolff et al. | 208/390 |
| 4,612,113 A | 9/1986 | Kallioinen | |

(Continued)

FOREIGN PATENT DOCUMENTS
WO    WO 01/32936    5/2001
(Continued)

OTHER PUBLICATIONS

Hong and Chao, "A Polar-Nonpolar, Acetic Acid/Heptane, Solvent Medium for Degradation of Pyrene by Ozone," *Ind. Eng. Chem. Res.* 43:7710-7715 (2004).

(Continued)

*Primary Examiner* — Walter D Griffin
*Assistant Examiner* — Renee Robinson
(74) *Attorney, Agent, or Firm* — Holland & Hart LLP

(57) ABSTRACT

A method and a system for obtaining bitumen from tar sand are disclosed. The disclosed method can include two extraction steps, such as a first extraction step using a light aromatic solvent and a second extraction step using a volatile hydrocarbon solvent. The light aromatic solvent and the volatile hydrocarbon solvent both can be recycled and used in multiple extractions. Each extraction and recycling step can include a separation. The disclosed system can include separators configured to perform these separations. Some of these separators also can function as mixers. Using the disclosed method and system, it is possible to achieve a high degree of bitumen recovery while minimizing undesirable complications, such as swelling of clays in the tar sand and/or precipitation of asphaltenes.

32 Claims, 3 Drawing Sheets

U.S. PATENT DOCUMENTS

| | | |
|---|---|---|
| 4,678,561 A | 7/1987 | Keys |
| 4,678,562 A | 7/1987 | Keys |
| 4,744,890 A | 5/1988 | Miller et al. |
| 4,859,317 A | 8/1989 | Shelfantook et al. |
| 5,143,598 A | 9/1992 | Graham et al. |
| 5,176,802 A | 1/1993 | Duyvesteyn et al. |
| 5,223,148 A | 6/1993 | Tipman et al. |
| 5,236,577 A | 8/1993 | Tipman et al. |
| 5,389,274 A | 2/1995 | Fernandez |
| 5,443,158 A | 8/1995 | McKenny et al. |
| 5,485,883 A | 1/1996 | Rippetoe et al. |
| 5,534,136 A * | 7/1996 | Rosenbloom ............. 208/390 |
| 5,538,081 A | 7/1996 | Rippetoe et al. |
| 5,554,301 A | 9/1996 | Rippetoe et al. |
| 5,626,743 A | 5/1997 | Humphreys |
| 5,626,793 A | 5/1997 | Reiffenrath et al. |
| 5,670,056 A | 9/1997 | Yoon et al. |
| 5,702,612 A | 12/1997 | Wang |
| 5,795,466 A | 8/1998 | Kelebek et al. |
| 5,849,201 A | 12/1998 | Bradley |
| 5,876,592 A | 3/1999 | Tipman et al. |
| 5,961,786 A | 10/1999 | Freel et al. |
| 5,968,349 A | 10/1999 | Duyvesteyn et al. |
| 6,007,709 A | 12/1999 | Duyvesteyn et al. |
| 6,036,849 A | 3/2000 | Rippetoe et al. |
| 6,074,558 A | 6/2000 | Duyvesteyn et al. |
| 6,106,787 A | 8/2000 | Rippetoe |
| 6,214,213 B1 | 4/2001 | Tipman et al. |
| 6,320,148 B1 | 11/2001 | Yoon et al. |
| 6,427,843 B1 | 8/2002 | Clark |
| 6,589,417 B2 | 7/2003 | Taciuk et al. |
| 6,793,079 B2 | 9/2004 | Khan et al. |
| 6,871,743 B2 | 3/2005 | Yoon et al. |
| 2002/0134704 A1 * | 9/2002 | Mitchell et al. ............. 208/13 |
| 2005/0070218 A1 | 3/2005 | Phillips et al. |
| 2005/0092682 A1 | 5/2005 | Phillips et al. |
| 2006/0144760 A1 | 7/2006 | Duyvesteyn et al. |
| 2007/0209971 A1 | 9/2007 | Duyvesteyn et al. |
| 2007/0284283 A1 | 12/2007 | Duyvesteyn et al. |
| 2008/0060257 A1 | 3/2008 | Duyvesteyn |
| 2008/0156702 A1 | 7/2008 | Duyvesteyn |
| 2008/0210602 A1 | 9/2008 | Duyvesteyn |
| 2009/0090654 A1 | 4/2009 | Duyvesteyn et al. |
| 2009/0145809 A1 | 6/2009 | Ledbetter, Jr. et al. |

FOREIGN PATENT DOCUMENTS

| | | |
|---|---|---|
| WO | WO 03/072506 | 9/2003 |
| WO | WO 2007/102819 A1 | 9/2007 |

OTHER PUBLICATIONS

Information about Related Patents and Patent Applications, see the section of the accompanying Information Disclosure Statement Letter entitled "Related Patents and Patent Applications" for further information.

International Search Report from International Application No. PCT/US2006/08263 (5 pgs.).

International Search Report from International Application No. PCT/US2005/03728 (8 pgs.).

* cited by examiner

METHOD FOR OBTAINING BITUMEN FROM TAR SANDS

CROSS REFERENCE TO RELATED APPLICATION

This claims the benefit of the earlier filing date of prior U.S. Provisional Application No. 60/617,739, filed Oct. 13, 2004, which is incorporated herein by reference.

FIELD

This disclosure relates generally to the recovery of bitumen from tar sands, such as by solvent extraction.

BACKGROUND

Tar sand, which also can be referred to as bituminous sand or oil sand, includes aggregates of sand, clay and bitumen. Most tar sand also contains water. Tar sand deposits can be found in many parts of the world, including North America. One of the largest tar sand deposits is in the Athabasca region of Alberta, Canada. It is estimated that the Athabasca tar sand deposit contains the equivalent of about 250 billion barrels of oil. By way of comparison, the proven worldwide oil reserve is estimated to be about 850 billion barrels.

Extracting usable oil from tar sand typically begins by separating the bitumen from the mineral components. With conventional technology, the high cost of this process makes oil derived from tar sand more expensive than oil from other sources. More readily available sources of oil, however, are depleting rapidly. Thus, there is an increasing need for methods capable of economically separating large quantities of bitumen from tar sand.

In addition to their high cost, conventional methods for obtaining bitumen from tar sand typically have an adverse impact on the environment. For example, many of these methods require significant quantities of finite resources, such as water and natural gas. Many conventional methods also form undesirable byproducts, such as fine tailings. Fine tailings typically are made up of clay, sand, water, and residual bitumen. Due to the water entrained in the clays, fine tailings can have a sludge-like consistency that lasts indefinitely. Byproducts such as fine tailings can be stored in ponds, but these ponds are costly to build and maintain and can be damaging to the local environment, including the local water supply.

Many conventional methods for obtaining bitumen from tar sand also have serious technical limitations. For example, many conventional methods use water, which can cause clays in the tar sand to swell and interfere with processing equipment. In addition, some conventional methods result in the undesirable precipitation of soluble asphaltenes.

One example of a conventional method is described in U.S. Pat. No. 4,046,668 (the '668 patent). The '668 patent discloses the extraction of hydrocarbons from tar sands with a mixture of light naphtha having from 5 to 9 carbon atoms per molecule and methanol. The method disclosed in the '668 patent is limited, in part, because it requires the simultaneous use of two solvents, which increases processing costs.

U.S. Pat. No. 4,347,118 (the '118 patent) discloses a method in which pentane is used to extract bitumen from tar sands. The method disclosed in the '118 patent requires the use of two fluidized bed drying zones. Operation of these fluidized bed drying zones requires a large amount of energy, thereby limiting the efficiency of the overall method.

U.S. Pat. No. 5,143,598 (the '598 patent) discloses a method that includes adding heptane to tar sand to form a bitumen-rich heptane phase and then displacing the bitumen-rich heptane phase with water. This method is limited, in part, because it requires steam vaporization and condensation, which are low-efficiency processes. Also, the use heptane, a non-aromatic solvent, can result in the precipitation of the heptane insoluble asphaltene fraction present in the bitumen phase. In addition, using water generates large amounts of aqueous waste. Use of water also can introduce undesirable impurities into the bitumen, such as chlorine, and can result in undesirable swelling of clays in the tar sand. Furthermore, the bitumen recovered by this method typically has a low purity and requires additional processing, such as by centrifugation. This further increases the cost of the overall method.

SUMMARY

Disclosed herein are embodiments of a method and system for obtaining bitumen from materials comprising bitumen, such as tar sand. Embodiments of the disclosed method can include first and second extraction steps. For example, the first extraction step can include mixing a material comprising bitumen with a light aromatic solvent to form a first mixture. This first mixture then can be separated into a bitumen-enriched light aromatic solvent phase and a bitumen-depleted sand phase. In the second extraction step, the bitumen-depleted sand phase can be mixed with a volatile hydrocarbon solvent to form a second mixture. The second mixture then can be separated into a bitumen-enriched volatile hydrocarbon solvent phase and a residual sand phase. Embodiments of the disclosed method also can include transporting the material comprising bitumen and the light aromatic solvent through a pipeline or mixing the material comprising bitumen and the light aromatic solvent in a pipeline.

The material comprising bitumen can be mixed with the light aromatic solvent in a countercurrent process. Similarly, the bitumen-depleted sand phase can be mixed with the volatile hydrocarbon solvent in a countercurrent process. The first mixture can be separated, for example, by settling the bitumen-depleted sand phase. Separating the first mixture also can include filtering the bitumen-depleted sand phase or separating the bitumen-depleted sand phase by gravity drainage. In some embodiments, the bitumen-depleted sand phase is mixed with the volatile hydrocarbon solvent at a pressure sufficient to maintain the volatile hydrocarbon solvent in liquid form, such as a pressure between about 20 kPa and about 1000 kPa. In some embodiments the bitumen-depleted sand phase is mixed with the volatile hydrocarbon solvent in a batch process. Similarly, in some embodiments, the second mixture is separated into the bitumen-enriched volatile hydrocarbon solvent phase and the residual sand phase in a batch process.

The light aromatic solvent used in embodiments of the disclosed method can include kerosene, diesel, gas oil, naphtha or a combination or derivative thereof. The light aromatic solvent also can include compounds such as benzene, toluene, aromatic alcohols and combinations and derivative thereof. In some embodiments, the light aromatic solvent has a boiling temperature between about 75° C. and about 375° C.

The volatile hydrocarbon solvent can include a cyclo- or iso-paraffin having between 3 and 9 carbons or a combination or derivative thereof. For example, the volatile hydrocarbon solvent can include butane. In some embodiments, the volatile hydrocarbon solvent has a boiling temperature between about −20° C. and about 150° C.

The material comprising bitumen can have a bitumen concentration of between about 3% and about 20% by weight prior to mixing with the light aromatic solvent. In these and other embodiments, the bitumen-depleted sand phase can have a bitumen concentration of between about 0.5% and about 5% by weight prior to mixing with the volatile hydrocarbon solvent. Similarly, in embodiments in which the material comprising bitumen has a bitumen concentration of between about 3% and about 20% by weight prior to mixing with the light aromatic solvent, the residual sand phase can have a bitumen concentration of between about 0.01% and about 2% by weight.

Both the light aromatic solvent and the volatile hydrocarbon solvent can be separated and recycled back into the process. Accordingly, some embodiments include separating the bitumen-enriched light aromatic solvent phase into a bitumen product and a recovered light aromatic solvent. This separation can be performed, for example, by heating the bitumen-enriched light aromatic solvent phase to a temperature greater than or equal to about a boiling temperature of the light aromatic solvent, such as a temperature between about 70° C. and about 170° C. These and other embodiments also can include separating the bitumen-enriched volatile hydrocarbon solvent phase into a bitumen product and a recovered volatile hydrocarbon solvent. This separation can be performed, for example, by reducing the pressure of the bitumen-enriched volatile hydrocarbon solvent phase.

Embodiments of the disclosed system for obtaining bitumen from a material comprising bitumen can include four separators, some of which also may function as mixers. The first separator, which can be a settling vessel, can be configured to separate the first mixture into the bitumen-enriched light aromatic solvent phase and the bitumen-depleted sand phase. The second separator, which can be a multi-hearth solvent recovery furnace, can be configured to separate the bitumen-enriched light aromatic solvent phase into the bitumen product and the recovered light aromatic solvent. The third separator, which can be an autoclave, can be configured to separate the second mixture into the bitumen-enriched volatile hydrocarbon solvent phase and the residual sand phase. Finally, the fourth separator, which can be an expansion vessel, can be configured to separate the bitumen-enriched volatile hydrocarbon solvent phase into additional bitumen product and the recovered volatile hydrocarbon solvent. The disclosed embodiments also can include a filter configured to filter the bitumen-depleted sand phase. Some embodiments also include a first pipeline configured to route the recovered light aromatic solvent into the first separator and/or a second pipeline configured to route the recovered volatile hydrocarbon solvent into the third separator.

It is to be understood that the foregoing is a brief summary of various aspects of some disclosed embodiments. The scope of the disclosure need not therefore include all such aspects or address or solve all issues noted in the background above. In addition, there are other aspects of the disclosed embodiments that will become apparent as the specification proceeds.

DETAILED DESCRIPTION

Figure 1:
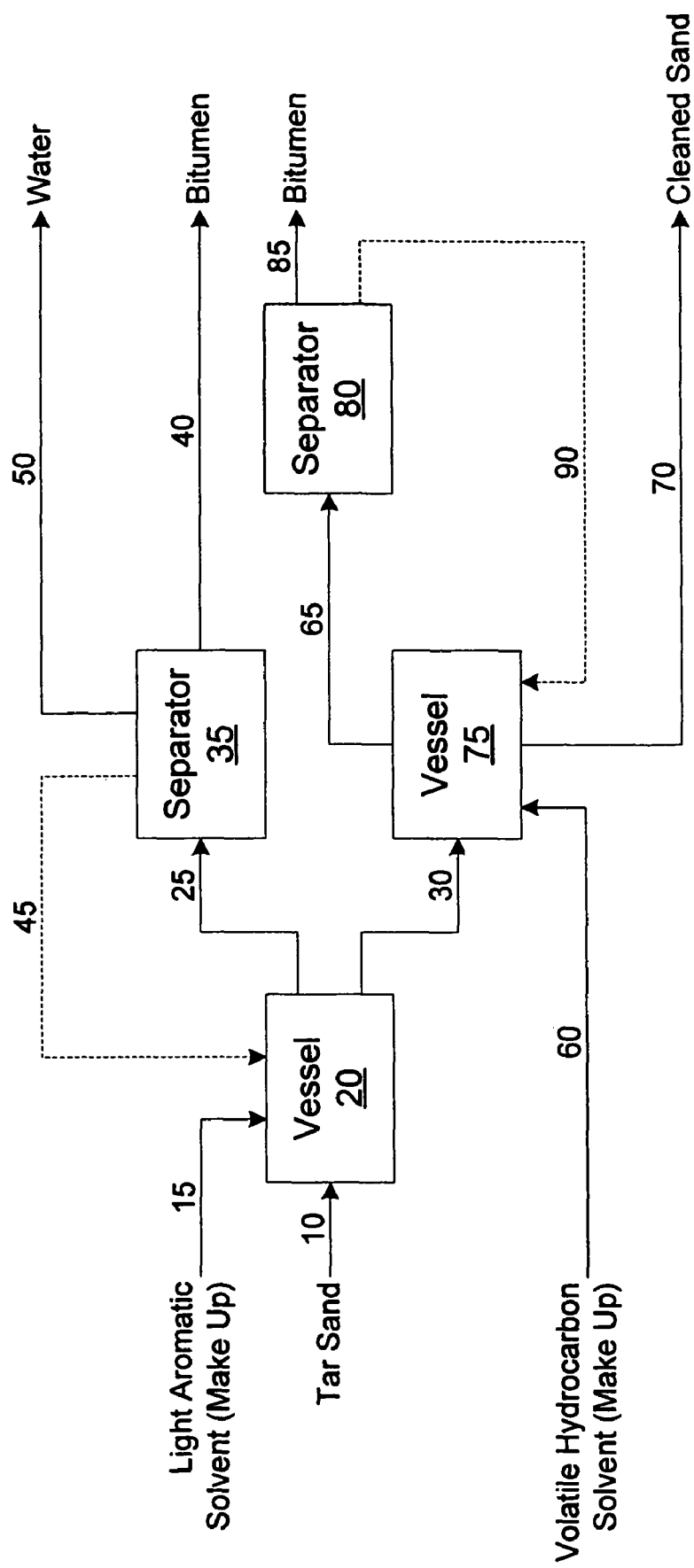
FIG. 1 is a schematic diagram representing embodiments of a process and apparatus for obtaining bitumen from tar sand.

Unless otherwise explained, all technical and scientific terms used herein have the same meaning as commonly understood by one of ordinary skill in the art to which this disclosure belongs. The singular terms "a," "an," and "the" include plural referents unless the context clearly indicates otherwise. Similarly, the word "or" is intended to include "and" unless the context clearly indicates otherwise. The term "includes" means "comprises." The terms "solvent," "a solvent" and "the solvent" include one or more than one individual solvent compound unless indicated otherwise. Mixing solvents that include more than one individual solvent compound with other materials can include mixing the individual solvent compounds simultaneously or serially unless indicated otherwise. The separations described herein can be partial, substantial or complete separations unless indicated otherwise. All percentages recited herein are weight percentages unless indicated otherwise.

Disclosed herein are embodiments of a method for obtaining bitumen from materials comprising bitumen. Tar sand is used throughout this disclosure as a representative material comprising bitumen. As used herein, the phrase "tar sand" includes a variety of compositions that include both bitumen and mineral components. Tar sand typically includes sand, clay, bitumen and water. The bitumen in tar sand typically includes oil, resins and asphaltenes. Depending on the composition, tar sand can have varying levels of hardness. Some tar sand is in the form of a rock-like ore. Other tar sand is generally granular. Upon separation from the mineral components of the tar sand, bitumen has many useful applications and also can be refined into valuable commodities, such as oil.

The disclosed embodiments for obtaining bitumen from tar sand can include a two-step solvent extraction process. In some embodiments, the first step includes mixing tar sand with a light aromatic solvent. This step can, for example, separate most of the bitumen into a bitumen-enriched light aromatic solvent phase. Bitumen product can be obtained by subsequently separating the light aromatic solvent from the bitumen product. The recovered light aromatic solvent then can be recycled back into the process. After removal of the bitumen-enriched light aromatic solvent phase, a bitumen-depleted sand phase remains. The second step can include mixing the bitumen-depleted sand phase with a volatile hydrocarbon solvent. The volatile hydrocarbon solvent can remove most, if not substantially all, of the remaining occluded bitumen. Additional bitumen product can be obtained by separating the volatile hydrocarbon solvent from the bitumen-enriched volatile hydrocarbon solvent phase. As with the light aromatic solvent, the recovered volatile hydrocarbon solvent can be recycled back into the process.

A variety of techniques and devices can be used to perform each process step of the disclosed embodiments. For example, in some embodiments, tar sand and light aromatic solvent are mixed in a vessel. The bitumen-enriched light aromatic solvent phase can be separated from the bitumen-depleted sand phase, for example, by settling and decanting. The mixing and settling can occur in the same vessel or in separate vessels. The light aromatic solvent can be recovered from the bitumen-enriched light aromatic solvent phase, for example, by heating the mixture to a temperature greater than or equal to about the boiling temperature of the light aromatic solvent. This step can be performed, for example, in a heating unit. In some embodiments, the bitumen-depleted sand phase is mixed with volatile hydrocarbon solvent in a pressurized vessel, such as an autoclave. The bitumen-enriched volatile hydrocarbon solvent phase then can be drained into another vessel and flash separated by rapidly decreasing the pressure. Each of the mixing and separation steps can be performed as a batch or continuous process. Also, certain process steps might be performed as batch processes and others as continuous processes. In some embodiments, batch processing results in more complete separations than continuous processing.

The light aromatic solvent used in some embodiments of the disclosed method can be any light aromatic solvent useful for extracting bitumen. In some of these embodiments, it also is desirable for the light aromatic solvent to be generally compatible with refinery operations. Typically, the light aromatic solvent is not 100% aromatic, but rather a mixture of aromatic and non-aromatic compounds. For example, the light aromatic solvent can include greater than zero to about 100% aromatic compounds, such as between about 10% and about 100% or between about 20% and about 100%. Examples of aromatic compounds that can be within the light aromatic solvent include benzene, toluene, aromatic alcohols and combinations and derivatives thereof. In some embodiments, the light aromatic solvent has a boiling temperature between about 75° C. and 375° C.

The light aromatic solvent can include compositions, such as kerosene, diesel, gas oil (e.g., light or medium light gas oil) or naphtha. Naphtha, for example, is particularly effective at dissolving bitumen and is generally compatible with refinery operations. Some examples of kerosene include hydrocarbons having between 9 and 15 carbons per molecule. Some examples of diesel include hydrocarbons having between 15 and 25 carbons per molecule. Some examples of light or medium light gas oil include hydrocarbons having between 13 and 20 carbons per molecule. Some examples of naphtha include hydrocarbons having between 4 and 12 carbons per molecule. These examples are not intended to limit the general meanings of the respective terms.

The volatile hydrocarbon solvent used in some embodiments of the disclosed method can be any volatile hydrocarbon solvent useful for extracting bitumen. The volatile hydrocarbon solvent can include a variety of individual compounds, such as alkanes or alkenes. These compounds can be functionalized or non-functionalized. Some useful volatile hydrocarbon solvents include lower carbon paraffins, such as cyclo- and iso-paraffins having between 3 and 9 carbons. Specific examples of useful volatile hydrocarbon solvent compounds include methane, ethane, propane, butane, pentane, hexane, heptane, octane, nonane, alkene equivalents of these compounds and combinations and derivatives thereof. In some embodiments, the volatile hydrocarbon solvent has a boiling temperature between about −20° C. and about 150° C., such as between about −10° C. and about 100° C. or between about −5° C. and about 50° C.

Embodiments of the disclosed method for obtaining bitumen from tar sand may have one or more advantages over conventional methods. For example, in comparison to conventional methods that use aqueous solutions, some disclosed embodiments typically do not cause swelling of clays in the tar sand. Clays in the tar sand are generally present as large chunks of consolidated material. Conventional methods that include hot water processing typically require mechanical agitation, which breaks down the chunks into small and swollen clay particles. Retaining the clays in a consolidated form helps to minimize interference with operation of the processing machinery. In addition, bitumen-barren clays that have not been exposed to aqueous solutions typically do not significantly disperse, which enables the clays to be separated by settling processes.

As another example, conventional one-step processes involving separation of bitumen from tar sand in a pressurized autoclave typically require careful monitoring of the ratio of bitumen to alkane solvent to minimize precipitation of asphaltenes. Precipitated asphaltenes tend to clog various pieces of equipment, such as filters and centrifuges, thereby increasing the need for maintenance. In contrast to these methods, embodiments of the disclosed method that include solvent extraction in a pressurized autoclave as a second step in a two-step extraction process typically avoid substantial precipitation of asphaltenes. This may occur, for example, because a significant portion of the asphaltenic fraction, such as most of the asphaltenic fraction or between about 70% and about 90% of the asphaltenic fraction, has been removed during the first extraction step. In the first extraction step, precipitation of asphaltenes can be reduced, for example, by using a solvent that is at least partially aromatic.

Some embodiments of the disclosed method for obtaining bitumen from tar sand are described in the following subsections.

Tar Sand and Light Aromatic Solvent

Figure 2:
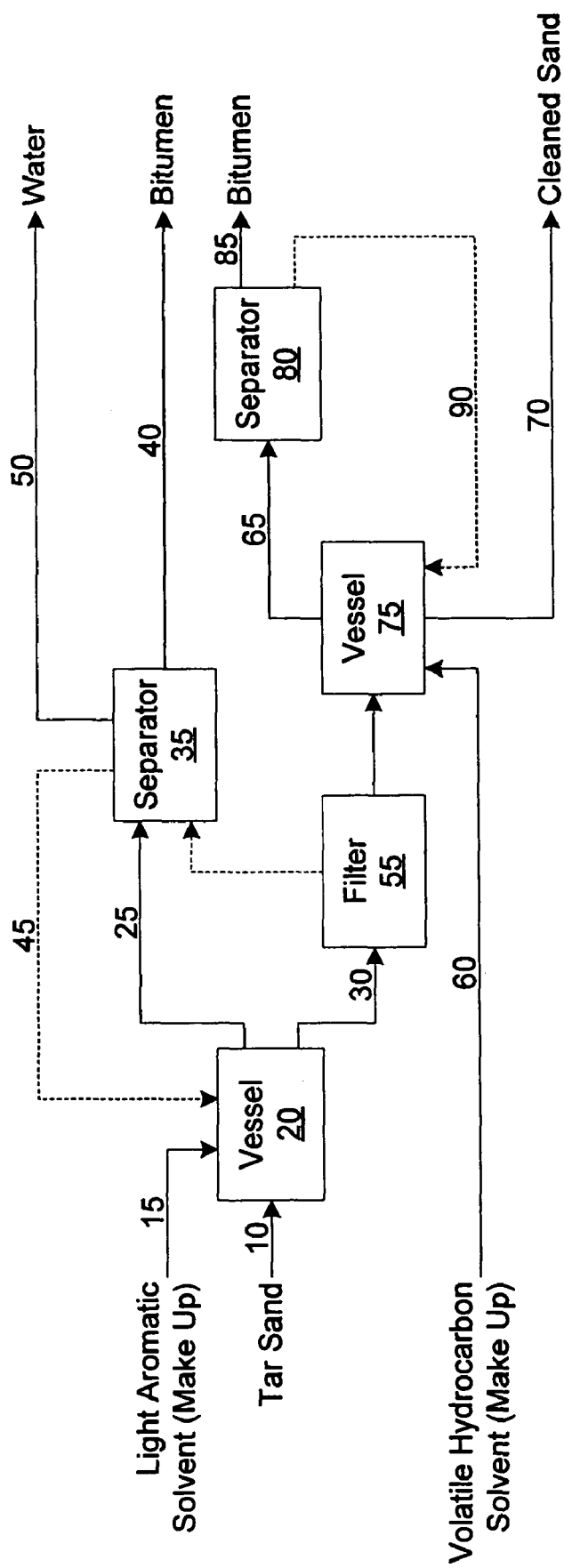
FIG. 2 is a schematic diagram representing embodiments of a process and apparatus for obtaining bitumen from tar sand including a filtration step/device.
Figure 3:
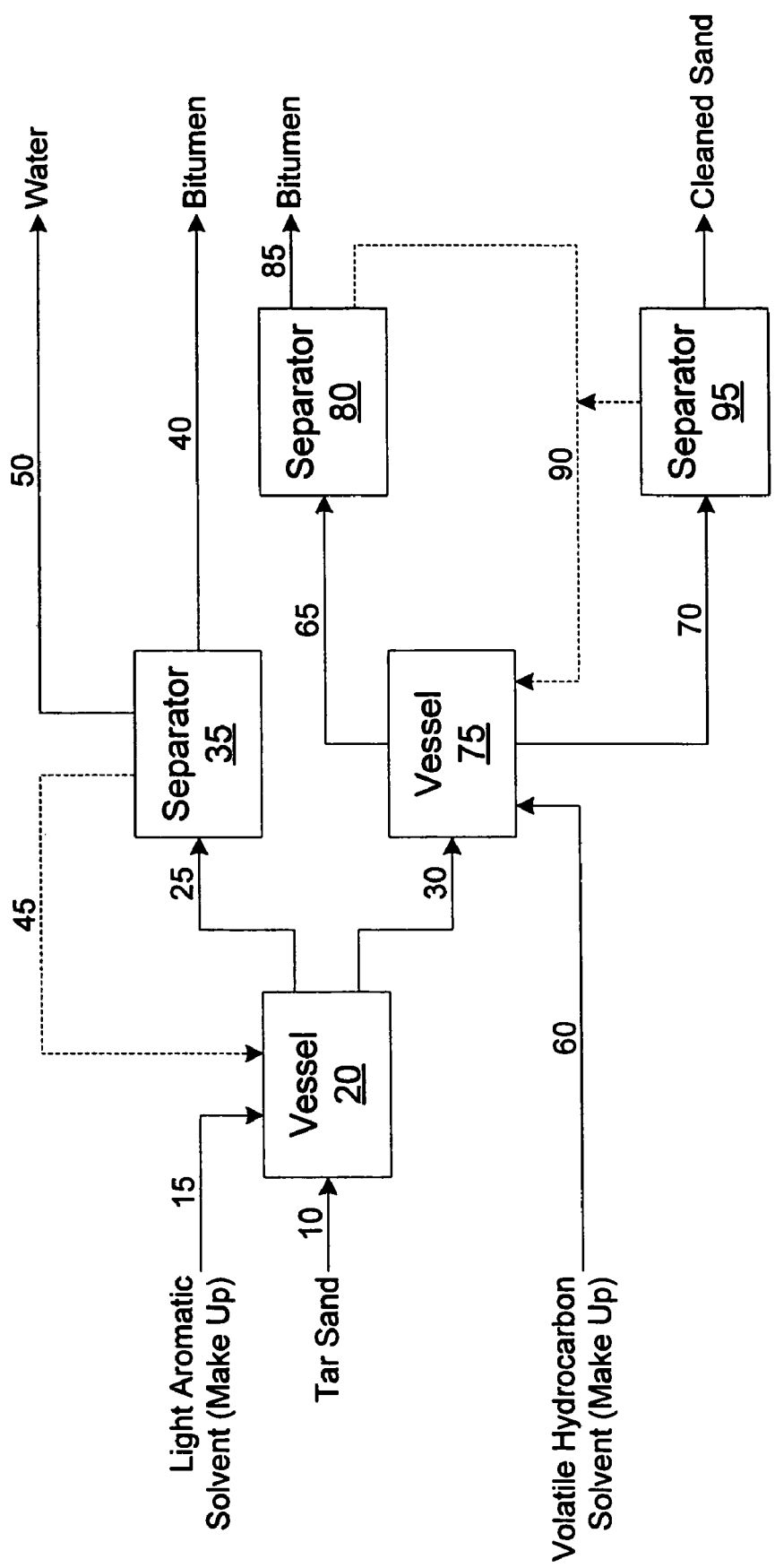
FIG. 3 is a schematic diagram representing embodiments of a process and apparatus for obtaining bitumen from tar sand including a separation step/device for removing additional solvent from the residual sand.

As shown in FIGS. 1, 2 and 3, tar sand 10 and light aromatic solvent 15 are routed into a vessel 20 and mixed to form a first mixture. The amount of light aromatic solvent 15 plus recovered light aromatic solvent 45 mixed with the tar sand 10 can be an amount effective to remove, or at least substantially remove, at least a portion of the bitumen in the tar sand. This amount can be, for example, between about 0.05 and about 2.0 times the amount of tar sand 10 by weight, such as between about 0.05 and about 1.0 or between about 0.1 and about 0.5.

The vessel 20 can be open or closed. In some embodiments, the tar sand 10 is routed into the vessel 20 using a conveyor belt. Conveyor belts are particularly well suited for transporting materials that cannot be transported easily through pipelines. For example, conveyor belts can be useful for transporting tar sand 10 in the form of a brittle ore. Prior to mixing with the light aromatic solvent 15, the tar sand 10 typically has a bitumen concentration of between about 3% and about 20% by weight, such as between about 5% and about 18%, between about 5% and about 17% or between about 8% and about 14%.

The vessel 20 can include a mixer for mixing the tar sand 10 and the light aromatic solvent 15. A countercurrent process can be used to facilitate this mixing step. For example, the tar sand 10 can be introduced near the top of the vessel 20, while the light aromatic solvent 15 is introduced near the bottom of the vessel. Sand from within the tar sand 10, which typically is heavier than the light aromatic solvent 15, will sink while the light aromatic solvent rises. Mixing can occur as the light aromatic solvent 15 flows upwardly against the downwardly flowing sand from the tar sand 10.

As an alternative to the configuration shown in FIGS. 1, 2 and 3, the tar sand 10 and the light aromatic solvent 15 can be mixed prior to being transported to the vessel 20. For example, the tar sand 10 and the light aromatic solvent 15 can be mixed at or near the location at which the tar sand is mined. In this way, the tar sand 10 can be converted into a slurry that can be transported to the vessel 20 through a pipeline. Additional mixing can occur as the slurry flows through the pipeline.

In some embodiments, the vessel 20 serves as both a mixer and a separator for separating the first mixture into a bitumen-enriched light aromatic solvent phase 25 and a bitumen-depleted sand phase 30. Alternatively, separate vessels can be used for mixing and separating. This separation step can be performed, for example, by settling the bitumen-depleted sand phase 30. After settling, the bitumen-depleted sand phase 30 can be extracted from near the bottom of the vessel 20, while the bitumen-enriched light aromatic solvent phase 25 is extracted from near the top of the vessel.

Typically, the bitumen-depleted sand phase 30 contains some occluded bitumen upon exiting the vessel 20, such as between about 0.5% and about 5% by weight. The occluded bitumen can be, for example, between about 3% and about 30% by weight of the bitumen originally present in the tar sand 10. For example, in embodiments in which the tar sand 10 has a bitumen concentration of between about 8% and about 14% by weight prior to mixing with the light aromatic solvent 15, the bitumen-depleted sand phase 30 can have a bitumen concentration of between about 1% and about 3% by weight. Similarly, in embodiments in which the tar sand 10 has a bitumen concentration of between about 3% and about 20% or between about 5% and about 18% by weight prior to mixing with the light aromatic solvent 15, the bitumen-depleted sand phase 30 can have a bitumen concentration of between about 0.5% and about 5% by weight.

Upon exiting the vessel 20, the bitumen-enriched light aromatic solvent phase 25 also may contain some fine solid material, such as between about 0.01% and about 5% or between about 0.1% and about 2% fine solid material by weight.

Bitumen-Enriched Light Aromatic Solvent Phase

As shown in FIGS. 1, 2 and 3, after exiting the vessel 20, the bitumen-enriched light aromatic solvent phase 25 can be routed into a separator 35 to be separated into a bitumen product 40 and a recovered light aromatic solvent 45. The separator 35 can operate, for example, by heating the bitumen-enriched light aromatic solvent phase 25 to a temperature that facilitates removal, such as by heating the bitumen-enriched light aromatic solvent phase to a temperature greater than or equal to about the boiling temperature of the light aromatic solvent 15. This can be a temperature, for example, between about 70° C. and about 350° C., such as between about 70° C. and about 170° C., between about 100° C. and about 350° C., between about 125° C. and about 200° C. or between about 140° C. and about 180° C. The heat can be provided, for example, by a heating unit, such as a heat exchanger. Heating can be done substantially at ambient pressure, at a pressure less than ambient, or at a pressure greater than ambient. In some embodiments, the separator 35 includes a vacuum distillation tower. The separator 35 also can include a pressure stabilizer to maintain a positive pressure. The pressure can be maintained, for example, by pumping an inert gas into the separator 35.

In embodiments in which the separator 35 includes a heating unit, the heating unit can be, for example, a multi-hearth solvent recovery furnace. Multi-hearth solvent recovery furnaces typically include alternating arrangements of centrally located hearths and peripherally located hearths. The hearths can be heated, for example, with oil fired muffles and/or high pressure steam coils. In some embodiments, hearths near the top of the furnace are heated to higher temperatures than hearths closer to the bottom of the furnace.

As mentioned above, the bitumen-enriched light aromatic solvent phase 25 may contain some fine solid material that was not completely separated into the bitumen-depleted sand phase 30. In some embodiments, the separator 35 is configured to function despite the presence of this fine solid material. For example, the separator 35 can include a suitable packing material, such as vertical slats, to provide increased surface area for condensation and evaporation. This packing material can be resistant to clogging by the fine solid material. In addition to fine solid material, the bitumen-enriched light aromatic solvent phase 25 may contain water 50. This water 50 can be withdrawn from the separator 35 for disposal.

The bitumen product 40 exiting the separator 35 can be sold as a commodity or subjected to further processing. For example, the bitumen product 40 can be subjected to further processing, such as settling and/or centrifugation, to remove additional fine solid material. The bitumen product 40 also can be refined to make oil and other useful products. Upon exiting the separator 35, the bitumen product 40 can have a concentration of fine solid material between about 1 ppm and about 10,000 ppm, such as between about 10 ppm and about 500 ppm or between about 50 ppm and about 250 ppm.

In some disclosed embodiments, the recovered light aromatic solvent 45 is recycled. For example, the recovered light aromatic solvent 45 can be routed back into the vessel 20 for mixing with additional tar sand 10. In these embodiments, fresh light aromatic solvent 15 may not be needed, or may be needed only as a make-up stream. For example, the first mixture can contain between about 2 and about 200 times as much recovered light aromatic solvent 45 as fresh light aromatic solvent 15, such as between about 10 and about 100 or between about 15 and about 25.

Bitumen-Depleted Sand Phase

As shown in FIG. 2, after exiting the vessel 20, the bitumen-depleted sand phase 30 can be filtered using a filter 55 or drained by gravity to remove additional bitumen-enriched light aromatic solvent phase 25, which then can be routed into the separator 35. The filter 55 can be, for example, a counter-current conveyor filter. After exiting the filter 55 or, as shown in FIG. 1, directly after exiting the vessel 20, the bitumen-depleted sand phase 30 can be mixed with a volatile hydrocarbon solvent 60 to form a second mixture. The amount of volatile hydrocarbon solvent 60 plus recovered volatile hydrocarbon solvent 90 added to the bitumen-depleted sand phase 30 can be an amount sufficient to at least partially remove or substantially completely remove occluded bitumen from the bitumen-depleted sand phase. This can be an amount, for example, between about 0.01 and about 1.0 times the amount of bitumen-depleted sand phase 30 by weight, such as between about 0.05 and about 0.5 or between about 0.05 and about 0.2.

After mixing, the second mixture can be separated into a bitumen-enriched volatile hydrocarbon solvent phase 65 and a residual sand phase 70. This separation can occur, for example, by settling out the residual sand phase 70. The mixing and separating can be performed in a batch or continuous process. In some embodiments, batch processing results in greater extraction of bitumen from the bitumen-depleted sand phase 30.

The mixing and separating can occur in one or more units. As shown in FIGS. 1, 2 and 3, the mixing and separating both can occur in a vessel 75. The vessel 75 can be, for example, a pressurized vessel, such as an autoclave. The volatile hydrocarbon solvent 60 can be added to the vessel 75 in liquid form. The vessel 75 can operate at a pressure and temperature sufficient to maintain the volatile hydrocarbon solvent 60 in liquid form. The pressure can be, for example, between about 20 kPa and about 1000 kPa, such as between about 100 kPa and about 1000 kPa, between about 40 kPa and about 750 kPa or between about 50 kPa and about 500 kPa. The temperature can be, for example, between about 5° C. and about 150° C., such as between about 10° C. and about 60° C. or about room temperature.

As with the tar sand 10 and the light aromatic solvent 15, a countercurrent process can be used to facilitate mixing of the bitumen-depleted sand phase 30 and the volatile hydrocarbon solvent 60. For example, the bitumen-depleted sand phase 30 can be introduced near the top of the vessel 75, while volatile hydrocarbon solvent 60 is introduced near the bottom of the vessel. Sand from within the bitumen-depleted sand phase 30, which typically is heavier than the volatile hydrocarbon solvent 60, will sink while the volatile hydrocarbon solvent rises. Mixing can occur as the volatile hydrocarbon solvent 60 flows upwardly against the downwardly flowing sand from the bitumen-depleted sand phase 30.

After separation from the bitumen-depleted sand phase 30, the residual sand phase 70 can have a concentration of bitumen between about 0.01% and about 2%, such as between about 0.02% and about 1% or between about 0.05% and about 0.25%. For example, in embodiments in which the tar sand 10 has a bitumen concentration of between about 3% and about 20% by weight prior to mixing with the light aromatic solvent 15, the residual sand phase 70 can have a concentration of bitumen between about 0.01% and about 2%. Similarly, the residual sand phase 70 can have a combined concentration of light aromatic solvent 15 and volatile hydrocarbon solvent 60 between about 0.01% and about 2%, such as between about 0.02% and about 1% or between about 0.05% and about 0.25%.

In some embodiments, the residual sand phase 70 is clean enough to be deposited back into the environment without further processing. Alternatively, as shown in FIG. 3, the residual sand phase 70 can be subjected to further hydrocarbon removal in a separator 95. This further hydrocarbon removal can include, for example, heating the residual sand phase 70 or reducing the pressure of the residual sand phase 70. Any volatile hydrocarbon solvent removed by the separator 95 can be added to the recovered volatile hydrocarbon solvent 90.

Bitumen-Enriched Volatile Hydrocarbon Solvent Phase

As shown in FIGS. 1, 2 and 3, the bitumen-enriched volatile hydrocarbon solvent phase 65 can be routed into a separator 80 after exiting the vessel 75. In some embodiments, the bitumen-enriched volatile hydrocarbon solvent phase 65 is introduced into the separator 80 under pressure. In the separator 80, the bitumen-enriched volatile hydrocarbon solvent phase 65 can be separated into a bitumen product 85 and a recovered volatile hydrocarbon solvent 90. This separation can be performed, for example, by rapidly reducing the pressure in the separator 80, which causes the volatile hydrocarbon solvent in the bitumen-enriched volatile hydrocarbon solvent phase 65 to evaporate. The recovered volatile hydrocarbon solvent 90 can be removed from the separator 80, recompressed into liquid form and then recycled back into the vessel 75.

In embodiments in which the recovered volatile hydrocarbon solvent 90 is recycled, the fresh volatile hydrocarbon solvent 60 may not be needed or may be needed only as a make-up stream. For example, the second mixture can contain between about 5 and about 250 times as much recovered volatile hydrocarbon solvent 90 as fresh volatile hydrocarbon solvent 60, such as between about 10 and about 150 or between about 25 and about 100.

As with the bitumen product 40 exiting the separator 35, the bitumen product 85 exiting the separator 80 can sold as a commodity or subjected to further processing. Upon exiting the separator 80, the bitumen product 85 can have a concentration fine solid material between about 1 ppm and about 1,000 ppm, such as between about 5 ppm and about 250 ppm or between about 25 ppm and about 100 ppm.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A method for obtaining bitumen, comprising:
mixing a material comprising bitumen with a light aromatic solvent to form a first mixture;
separating the first mixture into a bitumen-enriched light aromatic solvent phase and a bitumen-depleted sand phase;
mixing the bitumen-depleted sand phase with a volatile hydrocarbon solvent to form a second mixture; and
separating the second mixture into a bitumen-enriched volatile hydrocarbon solvent phase and a residual sand phase.

2. The method according to claim 1, wherein the material comprising bitumen is tar sand.

3. The method according to claim 1, wherein mixing the material comprising bitumen with the light aromatic solvent comprises mixing the material comprising bitumen with the light aromatic solvent in a countercurrent process.

4. The method according to claim 1, wherein separating the first mixture into the bitumen-enriched light aromatic solvent phase and the bitumen-depleted sand phase comprises settling the bitumen-depleted sand phase.

5. The method according to claim 1, wherein separating the first mixture into the bitumen-enriched light aromatic solvent phase and the bitumen-depleted sand phase comprises filtering the bitumen-depleted sand phase from the first mixture.

6. The method according to claim 1, wherein separating the first mixture into the bitumen-enriched light aromatic solvent phase and the bitumen-depleted sand phase comprises separating the bitumen-depleted sand phase by gravity drainage.

7. The method according to claim 1, wherein mixing the bitumen-depleted sand phase with the volatile hydrocarbon solvent comprises mixing the bitumen-depleted sand phase with the volatile hydrocarbon solvent in a countercurrent process.

8. The method according to claim 1, wherein mixing the bitumen-depleted sand phase with the volatile hydrocarbon solvent comprises mixing the bitumen-depleted sand phase with the volatile hydrocarbon solvent in a batch process.

9. The method according to claim 1, wherein mixing the bitumen-depleted sand phase with the volatile hydrocarbon solvent comprises mixing the bitumen-depleted sand phase with the volatile hydrocarbon solvent at a pressure sufficient to maintain the volatile hydrocarbon solvent in a liquid form.

10. The method according to claim 1, wherein mixing the bitumen-depleted sand phase with the volatile hydrocarbon solvent comprises mixing the bitumen-depleted sand phase with the volatile hydrocarbon solvent at a pressure between about 20 kPa and about 1000 kPa.

11. The method according to claim 1, wherein separating the second mixture into the bitumen-enriched volatile hydrocarbon solvent phase and the residual sand phase comprises separating the second mixture in a batch process.

12. The method according to claim 1, wherein the light aromatic solvent comprises kerosene, diesel, gas oil, naphtha or a combination or derivative thereof.

13. The method according to claim 1, wherein the light aromatic solvent comprises naphtha.

14. The method according to claim 1, wherein the light aromatic solvent comprises gas oil.

15. The method according to claim 1, wherein the light aromatic solvent comprises benzene, toluene, an aromatic alcohol or a combination or derivative thereof.

16. The method according to claim 1, wherein the light aromatic solvent has a boiling temperature less than about 200° C.

17. The method according to claim 1, wherein the volatile hydrocarbon solvent comprises a cyclo- or iso-paraffin having between 3 and 9 carbons or a combination or derivative thereof.

18. The method according to claim 1, wherein the volatile hydrocarbon solvent comprises butane.

19. The method according to claim 1, wherein the volatile hydrocarbon solvent has a boiling temperature between about −20° C. and about 150° C.

20. The method according to claim 1, wherein the material comprising bitumen has a bitumen concentration of between about 3% and about 20% by weight prior to mixing with the light aromatic solvent and the bitumen-depleted sand phase has a bitumen concentration of between about 0.5% and about 5% by weight prior to mixing with the volatile hydrocarbon solvent.

21. The method according to claim 1, wherein the material comprising bitumen has a bitumen concentration of between about 3% and about 20% by weight prior to mixing with the light aromatic solvent and the residual sand phase has a bitumen concentration of between about 0.01% and about 2% by weight.

22. The method according to claim 1, further comprising transporting the material comprising bitumen and the light aromatic solvent through a pipeline or mixing the material comprising bitumen and the light aromatic solvent in a pipeline.

23. The method according to claim 1, further comprising removing a portion of the volatile hydrocarbon solvent or a portion of the light aromatic solvent from the residual sand phase after separating the second mixture into the bitumen-enriched volatile hydrocarbon solvent phase and the residual sand phase.

24. The method according to claim 1, further comprising separating the bitumen-enriched light aromatic solvent phase into a bitumen product and a recovered light aromatic solvent.

25. The method according to claim 24, wherein the material comprising bitumen is a first quantity of material comprising bitumen and further comprising mixing a second quantity of material comprising bitumen with the recovered light aromatic solvent.

26. The method according to claim 24, wherein separating the bitumen-enriched light aromatic solvent phase into the bitumen product and the recovered light aromatic solvent comprises heating the bitumen-enriched light aromatic solvent phase to a temperature greater than or equal to about a boiling temperature of the light aromatic solvent.

27. The method according to claim 24, wherein separating the bitumen-enriched light aromatic solvent phase into the bitumen product and the recovered light aromatic solvent comprises heating the bitumen-enriched light aromatic solvent phase to a temperature between about 70° C. and about 170° C.

28. The method according to claim 1, further comprising separating the bitumen-enriched volatile hydrocarbon solvent phase into a bitumen product and a recovered volatile hydrocarbon solvent.

29. The method according to claim 28, wherein the bitumen-depleted sand phase is a first quantity of bitumen-depleted sand phase and further comprising mixing a second quantity of bitumen-depleted sand phase with the recovered volatile hydrocarbon solvent.

30. The method according to claim 28, wherein separating the bitumen-enriched volatile hydrocarbon solvent phase into the bitumen product and the recovered volatile hydrocarbon solvent comprises reducing the pressure of the bitumen-enriched volatile hydrocarbon solvent phase.

31. The method according to claim 1, wherein the material comprising bitumen is at about room temperature when mixing the material comprising bitumen with the light aromatic solvent to form the first mixture.

32. A method for obtaining bitumen, comprising:
mixing a first quantity of tar sand with a light aromatic solvent to form a first mixture;
separating the first mixture into a bitumen-enriched light aromatic solvent phase and a first quantity of bitumen-depleted sand phase;
separating the bitumen-enriched light aromatic solvent phase into a first bitumen product and a recovered light aromatic solvent;
mixing the recovered light aromatic solvent with a second quantity of tar sand;
mixing the first quantity of bitumen-depleted sand phase with a volatile hydrocarbon solvent to form a second mixture;
separating the second mixture into a bitumen-enriched volatile hydrocarbon solvent phase and a residual sand phase;
separating the bitumen-enriched volatile hydrocarbon solvent phase into a second bitumen product and a recovered volatile hydrocarbon solvent; and
mixing the recovered volatile hydrocarbon solvent with a second quantity of bitumen-depleted sand phase.

* * * * *